(12) United States Patent
Calderon et al.

(10) Patent No.: US 6,367,791 B1
(45) Date of Patent: Apr. 9, 2002

(54) SUBSTRATE MOUNTING SYSTEM FOR A THREE-DIMENSIONAL MODELING MACHINE

(75) Inventors: Joseph L. Calderon, Carlsbad; Andrew M. Hahn, Anaheim, both of CA (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

(21) Appl. No.: 09/611,688

(22) Filed: Jul. 7, 2000

(51) Int. Cl.[7] ................................................. B23Q 3/00
(52) U.S. Cl. ...................... 269/291; 269/900; 29/281.1; 29/281.6
(58) Field of Search .............................. 29/281.1, 281.6, 29/283.5; 269/289 R, 297, 299, 301, 302, 303, 305, 290, 291, 316, 318, 231, 43, 900

(56) References Cited

U.S. PATENT DOCUMENTS

| | | | |
|---|---|---|---|
| 1,685,899 A | * | 10/1928 | Andrew |
| 1,799,374 A | * | 4/1931 | Hurley |
| 2,547,211 A | * | 4/1951 | Holmes |
| 3,775,644 A | * | 11/1973 | Cotner et al. |
| 4,157,819 A | * | 6/1979 | Meyer |
| 4,749,347 A | | 6/1988 | Valavaara .................... 425/135 |
| 5,121,329 A | | 6/1992 | Crump ........................ 364/468 |
| 5,141,680 A | | 8/1992 | Almquist et al. ............. 264/22 |
| 5,143,817 A | | 9/1992 | Lawton et al. ............... 430/269 |
| 5,303,141 A | | 4/1994 | Batchelder et al. .......... 364/149 |
| 5,340,433 A | | 8/1994 | Crump ........................ 156/578 |
| 5,402,351 A | | 3/1995 | Batchelder et al. .......... 364/468 |
| 5,501,824 A | | 3/1996 | Almquist et al. ............ 264/401 |
| 5,569,349 A | | 10/1996 | Almquist et al. ............ 156/242 |
| 5,764,521 A | | 6/1998 | Batchelder et al. ....... 364/475.01 |
| 5,939,008 A | | 8/1999 | Comb et al. ................ 264/308 |
| 5,961,107 A | * | 10/1999 | Morghen |

FOREIGN PATENT DOCUMENTS

| | | | |
|---|---|---|---|
| JP | 62-206840 | * | 9/1987 |
| JP | 02-015927 | * | 1/1990 |

* cited by examiner

*Primary Examiner*—S. Thomas Hughes
*Assistant Examiner*—Eric Compton
(74) *Attorney, Agent, or Firm*—Kinney & Lange, P.A.

(57) ABSTRACT

A system for mounting a slab substrate in a three-dimensional modeling machine includes two parallel rails positioned on opposite sides of a modeling platform. A blade extends along each rail, each blade having an inward-facing knife edge. A slab substrate having a width which approximates the distance between the two rails and having slits in its sides is loaded in the machine by lining up the slits, respectively, with each blade and pushing the substrate towards the rear of the platform as the knife edges cut into the substrate. Preferably, the platform includes a rear stopper to stop rearward motion of the substrate. The platform preferably also includes a retaining means at its front edge that is actuated to lock the substrate into place on the platform during modeling. The substrate is removed from the platform by deactuating the retaining means, if any, grasping the substrate, and sliding the substrate towards the front of the platform.

10 Claims, 3 Drawing Sheets

SUBSTRATE MOUNTING SYSTEM FOR A THREE-DIMENSIONAL MODELING MACHINE

CROSS-REFERENCE TO RELATED APPLICATION(S)

None.

BACKGROUND OF THE INVENTION

The present invention relates to the fabrication of three-dimensional objects using additive process modeling techniques. More particularly, the invention relates to modeling machines which form three-dimensional objects by depositing modeling material onto a substrate mounted to a modeling platform.

Additive process modeling machines make three-dimensional models by building up a modeling medium, usually in planar layers, based upon design data provided from a computer aided design (CAD) system. A mathematical description of a physical part to be created is split into (usually) planar layers, and those layers are individually shaped and applied to produce the final part. Three-dimensional models are used for functions including aesthetic judgments, proofing the mathematical CAD model, forming hard tooling, studying interference and space allocation, and testing functionality. The dominant application of layered manufacturing in recent years has been for rapid prototyping.

Examples of apparatus and methods for making three-dimensional models by depositing solidifiable modeling material are described in Crump U.S. Pat. No. 5,121,329, Batchelder, et al. U.S. Pat. No. 5,303,141, Crump U.S. Pat. No. 5,340,433, Batchelder, et al. U.S. Pat. No. 5,402,351, Crump et al. U.S. Pat. No. 5,503,785, Abrams et al. U.S. Pat. No. 5,587,913, Danforth, et al. U.S. Pat. No. 5,738,817, Batchelder, et al. U.S. Pat. No. 5,764,521 and Comb et al. U.S. Pat. No. 5,939,008, all of which are assigned to Stratasys, Inc., the assignee of the present invention. An extrusion head extrudes solidifiable modeling material in a fluent strand (also termed a "bead" or "road") from a nozzle onto a base. The base comprises a modeling substrate which is removably affixed to a modeling platform. The extruded material is deposited layer-by-layer in areas defined from the CAD model, as the extrusion head and the base are moved relative to each other by mechanical means in three dimensions. The finished model is removed from the substrate. A solidifiable material which adheres to the previous layer with an adequate bond upon solidification is used as the modeling material. Thermoplastic materials have been found particularly suitable for these deposition modeling techniques.

Other additive process manufacturing techniques include depositing UV curable polymers as in Masters U.S. Pat. No. 5,134,569; jetting of droplets of material as in Helinski U.S. Pat. No. 5,136,515; extruding a seable plastic in vertical strips as in Valaaara U.S. Pat. No. 4,749,347; laser welding deposition as in Pratt U.S. Pat. No. 5,038,014; stacking and adhering planar elements as in DiMatteo U.S. Pat. No. 3,932,923; and applying shaped layers of paper as in Hull U.S. Pat. No. 5,192,559.

In additive process three-dimensional modeling machines utilizing manufacturing techniques such as those described above, the model is built up on a base comprising a substrate mounted on a modeling platform. The material being deposited must adhere to the substrate to form a foundation layer over which the remaining layers of the object are deposited. The substrate stabilizes the model as it is built up, and facilitates removal of the model from the modeling machine when the model is complete.

It is preferred that parts deposited on the modeling substrate be strongly adhered thereto to overcome two effects. First, strains generated within the extruded material tend to warp the deposited structures unless the structures are supported in their correct orientation. The substrate is important in serving to avoid localized shrinkage in the foundation layer. Second, in some deposition processes, there are forces such as pull from an extrusion nozzle and centripetal acceleration on parts that are not stationary, that tend to distort the deposited structures. A delamination of the foundation layer from the substrate during the building of the object could result in a total failure in forming the object. Further, since the removable substrate becomes a defining surface for the object being built, it must be held in a well-defined configuration. Typically, the substrate is held in a configuration approximating a plane.

The Crump '329 and '433 patents disclose a foam plastic material for use as a modeling substrate. A blue polystyrene material manufactured by Dow-Corning Corp. under that name and having a compression strength of 30 psi is identified as particulary suitable coarse, porous structure. The Crump '329 and '433 patents also disclose modeling on a wire mesh sandpaper substrate, and on a water soluble wax. The Batchelder et al. '521 patent discloses a sheet of magnetic material for use as a modeling substrate, wherein the modeling platform includes a magnet for attracting the sheet, while the Comb '008 patent discloses a flexible sheet substrate held down by vacuum forces.

In rapid prototyping systems sold in the past by Stratasys, Inc., a preferred substrate material has been a polymer foam. A foam slab substrate has proven particularly suitable for supporting models made by extrusion-based deposition modeling techniques. The porosity and compressibility of foam allows foundation layers of modeling material to be buried into the foam, which increases stability of the model as is it built up. The foam substrate is mounted onto a tray outside of the modeling machine. Up to eight spears are inserted through side walls of the tray and pressed into the foam to engage the foam from all sides. The tray is then placed on the modeling platform within the modeling machine, and locked into place. After the object is formed, the tray is removed from the modeling machine and the foam is broken away from the object.

While foam substrates have found substantial use, mounting the foam into a modeling machine with spears requires the user to spend time that could be better spent modeling. Additionally, the spears can be lost when not in use. Further, the foam materials used in the prior art produce dust when broken away from the object. The presence of dust creates a risk that the dust may contaminate bearings and bushings in the modeling machine.

SUMMARY OF THE INVENTION

The present invention is an apparatus and method for mounting a substrate to the modeling platform of a machine that builds up three-dimensional objects of predetermined design depositing solidifiable material on the substrate. The substrate mounting system of the present invention includes two parallel rails positioned on opposite sides of a modeling platform. A blade extends along each rail, each blade having an inward-facing knife edge. A slab substrate having a width which approximates the distance between the two rails and having slits in its sides is loaded in the machine by lining up the slits with each knife edge and pushing the slab towards the rear of the platform as the knife edges penetrate the slab. Preferably, the platform includes a rear stopper to stop rearward motion of the substrate. The platform preferably also includes a retainer or retainers at its front edge that lift up to lock the substrate into place on the platform during modeling. The substrate is removed from the platform by releasing the front edge retainers, if any, grasping the substrate, and sliding the substrate towards the front of the platform.

DETAILED DESCRIPTION OF THE PREFERRED EMBODIMENTS

Figure 1:
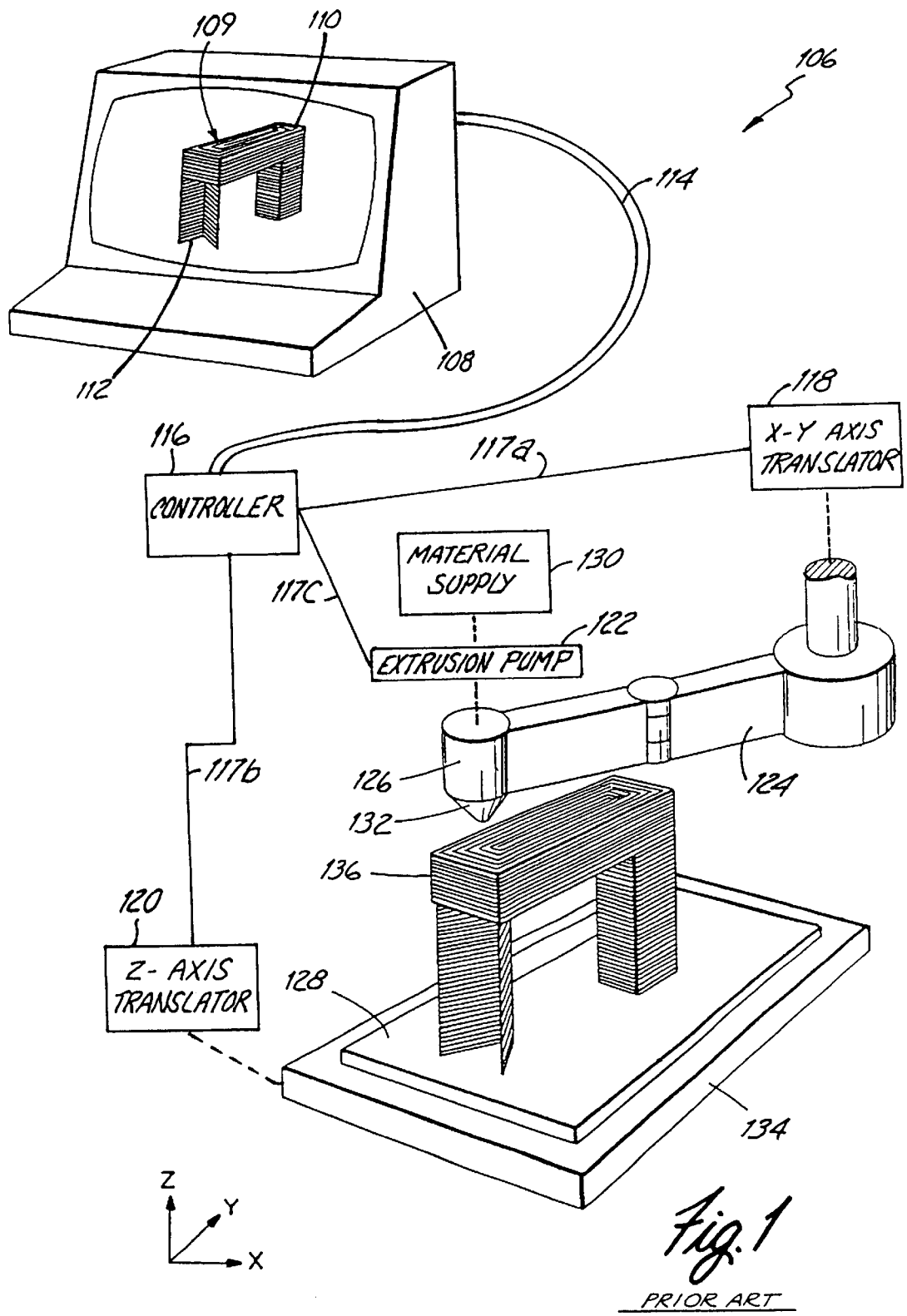
FIG. 1 is a schematic of a representative generic extrusion-based, layered deposition modeling system.

FIG. 1 shows a generic representation of a extrusion-based layered modeling system 106, of a type known in the art, in which the present invention may be used. A computer aided design (CAD) program resident in a processor 108 generates a file describing the geometry of a part 109 to be created. A slicing program (shown as resident in processor 108 but which may alternatively be resident in a separate processor) algorithmically subdivides the file into volume elements 110 corresponding to shapes that can be extruded from a nozzle. Additional volume elements 112 are added as necessary to provide mechanical support to a part during its construction. The volume elements are sequentially ordered so that deposited material is supported appropriately.

An electronic controller 116, in response to receiving three-dimensional shape data from processor 108 over line 114, controls the extrusion of modeling material in an xyz-coordinate reference frame so that beads of modeling material are extruded layer-by-layer in a pattern defined by the volume elements 110 and 112. Controller 116 sends control signals to an x-y axis translator 118, a z-axis translator 120 and an extrusion pump 122, over output signal lines 117a, 117b and 117c, respectively. X-y axis translator 118 is an electromechanical device that moves a robotic arm 124, so as to sequentially position an extrusion head 126 carried by the arm 124 within an x-y plane with respect to a modeling substrate 128. Extrusion pump 122 synchronously provides modeling material from a material supply 130 to extrusion head 126. The extrusion head 126 terminates in a nozzle 132 through which the modeling material is extruded.

The modeling material is extruded from nozzle 132 onto the substrate 128, which is removably mounted onto a modeling platform 134. Modeling platform 134 moves in a z-direction under the control of z-axis translator 120. Z-axis translator 120 incrementally lowers modeling platform 134 following deposition of a layer of modeling material, to build up a model 136 on the substrate 128. After the model 136 is created, the model 136 is removed from the modeling system 106 and from the substrate 128.

In the generic representation shown, the extrusion head 126 is movable in a horizontal plane in x and y directions, while the modeling platform 134 is movable in a vertical z-direction. It is recognized in the art, however, that any three-dimensional relative movement of the extrusion head 126 and the modeling platform 134 may be implemented to create a three-dimensional object by extrusion-based manufacturing.

A substrate mounting system is now described which has application for mounting a slab substrate in an additive process three-dimensional modeling system, such as the type described above and shown in FIG. 1. It should be understood, however, that the teaching of this invention is not limited for use only with an extrusion-based layered manufacturing apparatus of the type shown. That is, the invention can be used to advantage in other types of additive process three-dimensional modeling machines, such as those identified in the background section herein.

Figure 2:
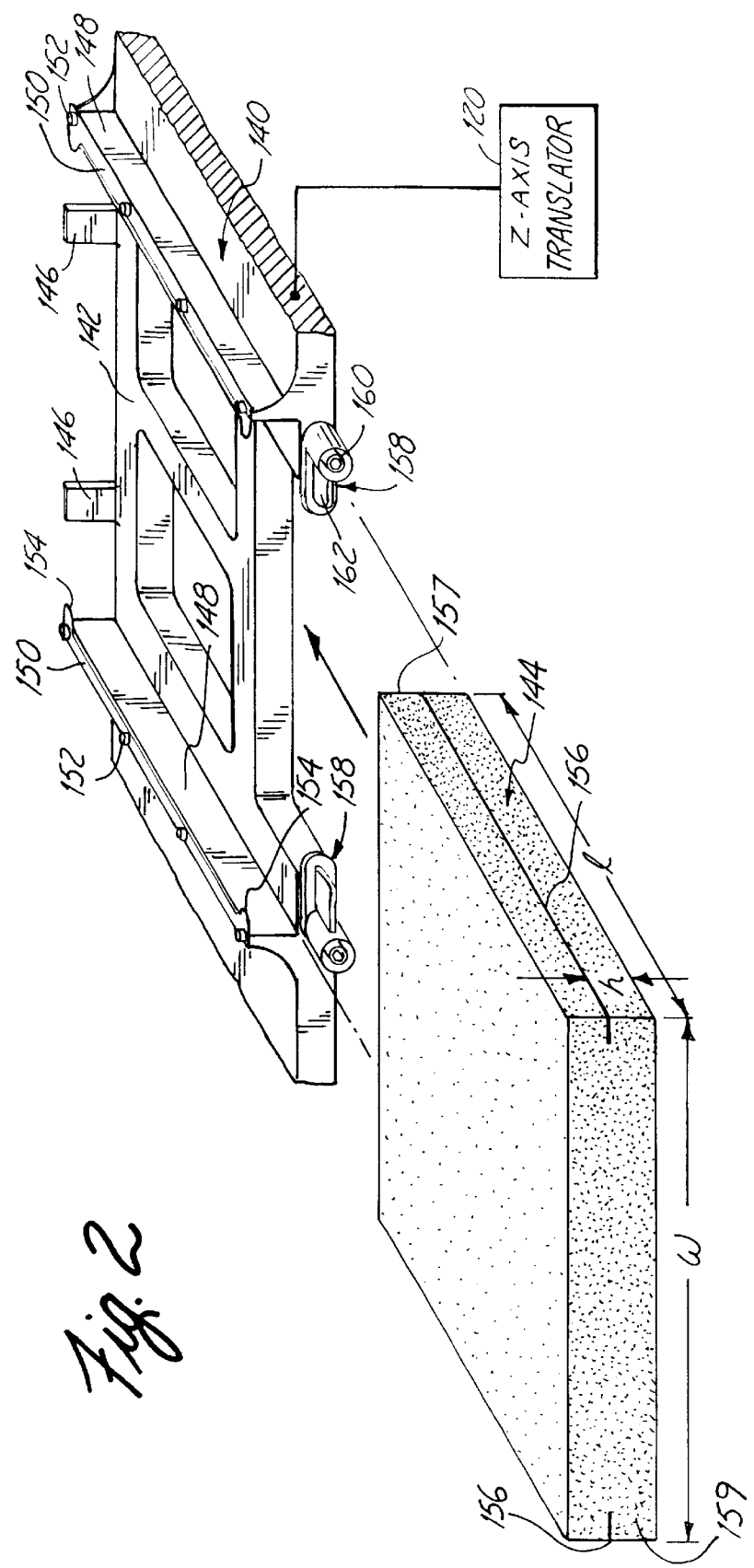
FIG. 2 is a perspective view of the preferred embodiment of the invention, before a substrate is mounted on the modeling platform.

A preferred embodiment of the substrate mounting system of the present invention is shown in FIG. 2. A z-axis stage 140 includes a horizontal modeling platform 142 for supporting a slab substrate 144. As shown, the z-axis stage 140 is made of cast metal and the platform 142 has open spaces, which reduce the materials cost and the weight of the platform. Those skilled in the art will recognize the platform 142 may alternatively be solid and that numerous other variations in the configuration of platform 142 are possible, so long as the platform will support a slab substrate 144 in a defined configuration on which to build a model.

A rear stopper 146 extends upward from the rear of modeling platform 142. The rear stopper 146 is formed of two rigid projections in the embodiment shown, but alternative configurations will be recognized by those skilled in the art, such as a solid wall, a gate or a rotating retainer. Two parallel rails 148 are mounted on opposed sides of the platform 142, and define a substrate mounting area extending generally from a front end of the platform to the rear thereof. A pair of blades 150 extend along each rail 148, and are mounted to the top of each rail 148 by fasteners 152. Each blade 150 has two knife edges 154, at either end of the blade, which extend horizontally from the blade 150 and face each other. Desirably, the knife edges 154 have a thickness that is greater than the thickness of the blade 150 in between the knife edges 154, to lessen the force required in mounting and removing the substrate 144 as described below.

A slab substrate 144 for use in the present invention (as shown in FIG. 1) has a width w that approximates the distance between the two rails 148, and a length l that approximates the length of the rails 148. Substrate 144 further has a slit 156 pre-cut into each of two opposite sides thereof, at a height h. Height h corresponds to the vertical distance from the platform 142 to the blades 150. Each slit 156 extends the length l of the substrate 144, from a leading edge 157 to a trailing edge 159. Each slit 156 is preferably slightly less deep than the distance of the protrusion of knife edges 154 from the rails 148. The upper and lower surfaces of substrate 144 approximates a plane.

Figure 3:
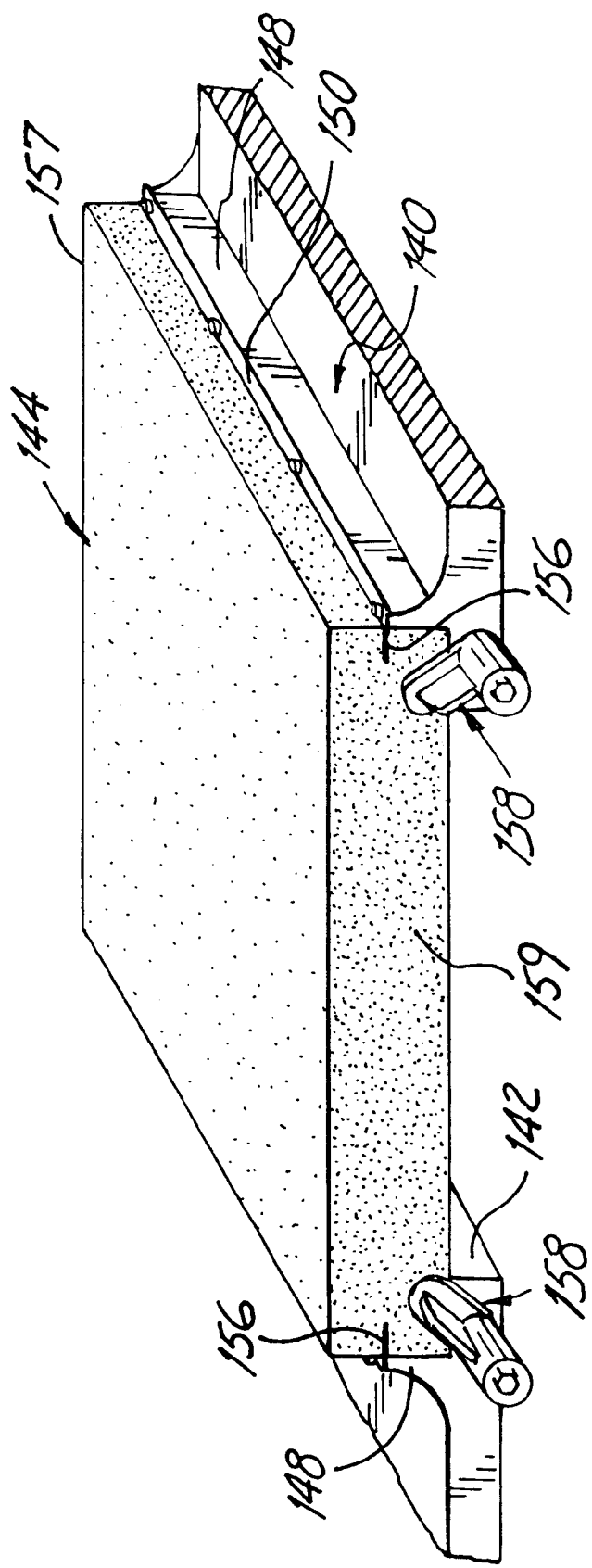
FIG. 3 is a perspective view of the preferred embodiment of the invention, after a substrate is mounted on the modeling platform.

A user loads substrate 144 onto platform 142 by aligning the leading edge 157 of the substrate 144 with the blades 150 so that the blades 150 mate with the slits 156. The user pushes the substrate 144 towards the rear of the platform 142 as the knife edges 154 of blades 150 penetrate the substrate 144 at the position of the slits 156. The user continues to push until a hard stop is reached, by the action of the substrate 144 pushing against rear stopper 146. The substrate 144 is then bound on its sides by the rails 148, bound at its leading edge 157 by rear stopper 146, and adhered to the platform 142 by blades 150. Friction prevents the foam from moving in the x-y plane. For added assurance that the substrate 144 will not slide forward during modeling, the substrate is bounded on its trailing edge 159 by a pair of retainers 158. Each retainer 158 is rotatably mounted to the front of platform 142 by a fastener 160, and includes a grip 162. After the substrate 144 is mounted on the platform 142, the user grasps the grips 162 to rotate retainers 158 into an upward position. FIG. 3 shows the substrate 144 mounted on the modeling platform 142.

A low-dusting polymer foam having good compression strength is a preferred material to be utilized as the slab substrate 144. The low-dusting characteristic is desirable so as to reduce user clean up time and reduce risk of machine contamination. Those skilled in the art will recognize that other materials which share similar characteristics as a polymer foam could be used as well.

The slits 156 reduce the force required by the user to install the substrate 144, help to guide the substrate 144 onto the platform 142, and also reduce the amount of dusting created by knife edges 154 cutting into the substrate 144. The substrate loading apparatus of present invention may, however, be practiced to some advantage using a substrate 144 that does not have pre-cut slits. Conversely, a slit 156 can be cut into all four sides of the substrate 144 if desired, to provide flexibility in the orientation of the substrate 144 on the platform 142.

The design of blades 150 wherein the blades 150 are thin in between the knife edges 154 similarly reduces the force required by the user to install the substrate 144, by reducing frictional forces against the substrate. Alternatively, knife edges 154 could extend the entire length of blades 150.

Although the present invention has been described with reference to preferred embodiments, workers skilled in the art will recognize that changes may be made in form and detail without departing from the spirit and scope of the invention.

What is claimed is:

1. An apparatus for removably mounting a slab substrate in a machine a that builds objects by depositing modeling material onto the substrate, the apparatus comprising:
   a platform for supporting a slab substrate in a defined configuration, the platform being bound on two opposed sides by a pair of parallel rails and having an open front end through which a slab substrate may be slidably loaded onto the platform between the rails; and
   a pair of blades mounted to the rails, each blade having an inward-facing knife edge protruding past its associated rail so as to penetrate the sides of a slab substrate being slidably loaded onto the platform, thereby adhering the substrate to the platform.

2. The apparatus of claim 1, and further comprising:
   a slab substrate having a width which approximates the distance between the rails and having pre-cut slits in its sides at a height corresponding to the distance from the platform to the knife edges, the slits having a depth less than the distance of the protrusion of the knife edges from the rails.

3. The apparatus of claim 1, and further comprising:
   a rear retaining means for confining a slab substrate at a rearward position of the platform.

4. The apparatus of claim 2, and further comprising:
   a front retaining means for confining a slab substrate at a forward position of the platform.

5. The apparatus of claim 4, and further comprising:
   a slab substrate having a width which approximates the distance between the rails, a length which approximates the distance from the forward position of the platform to the rearward position thereof, and having pre-cut slits in its sides at a height corresponding to the distance from the platform to the knife edges, the slits having a depth less than the distance of the protrusion of the knife edges from the rails.

6. An apparatus for removably mounting a slab substrate in a machine a that builds objects by depositing modeling material onto the substrate, the apparatus comprising:
   a platform for supporting a slab substrate in a defined configuration, the platform being bound on two opposed sides by a means for confining and having an open front end through which a slab substrate may be slidably loaded onto the platform between said means; and
   a pair of blades mounted above the platform on either side thereof, each blade having an inward-facing knife edge protruding past the means for confining so as to penetrate the sides of a slab substrate being slidably loaded onto the platform, thereby adhering the substrate to the platform.

7. The apparatus of claim 6, and further comprising:
   a slab substrate having a width which approximates the distance between the means for confining and having pre-cut slits in its sides at a height corresponding to the distance from the platform to the knife edges.

8. The apparatus of claim 7, wherein the slits have a depth less than the distance of the protrusion of the knife edges from the means for confining.

9. The apparatus of claim 6, and further comprising:
   a rear retaining means for confining a slab substrate at a rearward position of the platform.

10. The apparatus of claim 9, and further comprising:
    a front retaining means for confining a slab substrate at a forward position of the platform.

* * * * *

UNITED STATES PATENT AND TRADEMARK OFFICE
CERTIFICATE OF CORRECTION

PATENT NO.   : 6,367,791 B1
DATED        : April 9, 2002
INVENTOR(S)  : Joseph L. Calderon It is certified that error appears in the above-identified patent and that said Letters Patent is hereby corrected as shown below:

<u>Column 1,</u>
Line 55, delete "seable", insert -- settable --

<u>Column 5,</u>
Line 41, delete "machine a", insert -- machine --

Signed and Sealed this

Twenty-fifth Day of June, 2002

*Attest:*

JAMES E. ROGAN
*Attesting Officer*  *Director of the United States Patent and Trademark Office*